(12) United States Patent
Patel

(10) Patent No.: US 8,226,393 B2
(45) Date of Patent: Jul. 24, 2012

(54) SYSTEM FOR VACUUM FORMATION OF DENTAL APPLIANCE

(76) Inventor: Mitesh Patel, Belle-Mead, NJ (US)

( * ) Notice: Subject to any disclaimer, the term of this patent is extended or adjusted under 35 U.S.C. 154(b) by 51 days.

(21) Appl. No.: 12/662,087

(22) Filed: Mar. 30, 2010

(65) Prior Publication Data
US 2011/0003025 A1    Jan. 6, 2011

(51) Int. Cl.
*B29C 43/06* (2006.01)
(52) U.S. Cl. ........ 425/141; 425/504; 425/507; 425/384; 425/388
(58) Field of Classification Search .......... 425/504, 425/507–508, 141, 150, 384, 388
See application file for complete search history.

(56) References Cited

U.S. PATENT DOCUMENTS

| | | | | |
|---|---|---|---|---|
| 4,270,892 | A * | 6/1981 | Faunce | 425/388 |
| 4,941,826 | A | 7/1990 | Loran et al. | |
| 5,518,385 | A * | 5/1996 | Graff | 425/388 |
| 5,829,980 | A * | 11/1998 | Sheridan et al. | 425/388 |
| 6,918,761 | B2 | 7/2005 | Sachdeva et al. | |
| 7,153,135 | B1 | 12/2006 | Thomas | |
| 7,160,094 | B2 * | 1/2007 | Wyatt | 425/141 |
| 7,261,533 | B2 * | 8/2007 | Wrosz et al. | 425/110 |
| 2006/0121408 | A1 | 6/2006 | Hedge et al. | |
| 2007/0141525 | A1 | 6/2007 | Cinader, Jr. | |
| 2008/0050692 | A1 | 2/2008 | Hilliard | |
| 2008/0141534 | A1 | 6/2008 | Hilliard | |
| 2008/0206702 | A1 | 8/2008 | Hedge et al. | |
| 2008/0233528 | A1 | 9/2008 | Kim et al. | |
| 2008/0233530 | A1 | 9/2008 | Cinader | |
| 2008/0233531 | A1 | 9/2008 | Raby et al. | |
| 2008/0254402 | A1 | 10/2008 | Hilliard | |

FOREIGN PATENT DOCUMENTS

| | | |
|---|---|---|
| DE | 197 14 759 A1 | 10/1998 |
| JP | 58-142807 A | 8/1983 |

* cited by examiner

*Primary Examiner* — Richard Crispino
*Assistant Examiner* — Thukhanh Nguyen
(74) *Attorney, Agent, or Firm* — Richard C. Litman

(57) ABSTRACT

The system for vacuum formation of a dental appliance is a fully automated vacuum formation machine for dental appliances, such as retainers and the like. The system includes a base having a perforated top vacuum plate in communication with a vacuum source. A heating unit is positioned above the perforated top vacuum plate, and a controller is in communication with the heating unit and the vacuum source for selective actuation thereof. A holder releasably receives a thermoplastic plate. The holder is selectively positionable vertically over the perforated top vacuum plate and a dental impression cast mounted thereon. The holder is positioned by a linear actuator or the like, in communication with the controller. A sensor is positioned adjacent the perforated top vacuum plate for measuring the thermoplastic plate's thickness as it is molded about the dental impression cast, and is communication with the controller.

18 Claims, 5 Drawing Sheets

SYSTEM FOR VACUUM FORMATION OF DENTAL APPLIANCE

CROSS-REFERENCE TO RELATED APPLICATION

This application claims the benefit of U.S. Provisional Patent Application Ser. No. 61/213,695, filed Jul. 6, 2009.

BACKGROUND OF THE INVENTION

1. Field of the Invention

The present invention relates to automated devices for making dental appliances, and particularly to a system for vacuum formation of a dental appliance.

2. Description of the Related Art

FIG. 1 illustrates a typical dental retainer R, including a retainer body 12, which is vacuum formed from a sheet or plate of thermoplastic material 20 (as will be described in detail below with regard to FIG. 4) on a dental impression cast 16 (shown in FIG. 3). The dental impression cast 16 is formed from a conventional dental impression tray 10, shown in FIG. 1, using a conventional vacuum thermoforming machine 32 (shown in FIG. 3). The retainer body 12 is characterized by multiple tooth impressions 17, corresponding to the respective teeth of the patient's lower anterior dentition. The retainer body 12 includes a lingual surface 13, which covers the lingual gingiva 19 of the dentition during use of the retainer, and a facial or labial surface 48, which covers the labial surface of the dentition.

Projecting divots 15 are typically formed in the labial or lingual surface of the retainer body 12 and extend into the plastic tooth impressions 17, corresponding to teeth that are in need of repositioning. Openings or windows 46 are cut in the retainer body 12 on the opposite labial or lingual side from the respective divots 15 to accommodate repositioning movement of the teeth in the tooth socket, since the divots 15 apply constant repositioning pressure to the respective teeth 14 while the retainer R is worn on the dentition over a period of time. The retainer body 12 is maintained in position on the patient's dentition by snugly engaging the natural undercuts below the contact points of adjacent teeth, and may be removed as desired.

Retainer R is constructed by first making a dental impression 43 of the patient's upper or lower dentition, or both, preferably using a precision impression material, such as polyvinyl siloxane, and a standard or conventional dental impression tray 10, as shown in FIG. 2. A dental impression cast 16 is then made from that portion of the dental impression 43 corresponding to the area of malpositioned teeth (often the anterior dentition, or the portion of the dentition extending from the left canine to the right canine, as illustrated in FIG. 3). The dental impression cast 16 includes a lingual surface 47, a labial surface and cast teeth 18.

Prior to forming the retainer R, the dental impression cast 16 typically is dried thoroughly and trimmed so that the occlusal surfaces 49 of the cast teeth 18 have a slanted or tapered configuration, as shown in FIG. 3, to facilitate easy removal of the retainer body 12 from the dental impression cast 16. Because the retainer R is maintained in position on the patient's dentition by "snapping into" the multiple undercuts below the contact points of adjacent teeth, the undercuts on the dental impression cast 16 may need trimming for augmentation if their presence on the dental impression cast 16 is not evident.

FIG. 4 illustrates a typical prior art vacuum thermoforming machine 32, having a base 33 with a perforated top vacuum plate and a heating unit 34 extending from the base 33 and mounted on a frame post 41. Heating unit 34 is energized by a heater switch 37, and the machine 32 is used to vacuum thermoform a retainer body 12 having tooth impressions 17 matching the cast teeth 18 of the dental impression cast 16.

The vacuum thermoforming machine 32 also includes a slidable frame 36 having a top frame member 36a hinged to a bottom frame member 36b. The top frame member 36a is removably latched to the bottom frame member 36b by means of a frame latch knob 39. A vacuum motor is contained in the base 33 and is energized by a vacuum motor switch 38.

The retainer body 12 is formed on the dental impression cast 16 by first energizing the heating unit 34 of the vacuum thermoforming machine 32 by actuation of the heater switch 37. The dental impression cast 16 is then placed on the perforated vacuum plate on the top of the base 33, with the cast teeth 18 of the dental impression cast 16 facing upwardly. Before the frame 36 is raised on the frame post 41 by means of frame lift knobs 40 to within a suitable heating distance of the heating unit 34, the top frame member 36a is pivoted upwardly with respect to the bottom frame member 36b.

A thermoplastic plate 20 is then centered on the bottom frame member 36b. The top frame member 36a is then pivoted downward and secured by the frame latch knob 39, and the frame 36 is raised on the frame post 41 so that the thermoplastic plate 20 is located immediately beneath the heating unit 34. After approximately twenty-five to fifty seconds, the thermoplastic plate 20 is heated to a suitable thermoforming temperature and typically begins to sag slightly, but should not be heated to such a temperature that it is allowed to sag about half an inch or more.

The vacuum motor in the base 33 is then energized by actuation of the vacuum motor switch 38, and the frame 36 is rapidly lowered on the frame post 41 over the vacuum plate of the base 33 by the frame lift knobs 40, so that the softened thermoplastic plate 20 is first draped and then tightly vacuum-pulled over the dental impression cast 16. After ten to fifteen seconds, the retainer body 12 has been formed from the thermoplastic plate 20, and the heating unit 34 is turned off. Immediately after thermoforming the retainer body 12 on the dental impression cast 16, the retentive proximal undercuts in the retainer body 12 can be enhanced, as needed, while the plastic retainer body 12 remains formable.

As the retainer body 12 begins to set and cool on the dental impression cast 16, the retainer body 12 contracts against the dental impression cast 16. This thermal contraction of the retainer body 12 causes the impressionable plastic of the retainer body 12 to conform to the configuration and texture of the dental impression cast 16, including that portion of the dental impression cast 16 corresponding to the natural undercuts of the patient's dentition. The retainer body 12 is then removed from the cast 16 for insertion in the patient's mouth.

In the prior art system 32, the dentist or dental technician is required to manually lower the frame 36 over the cast 16 and determine by sight alone when the plastic plate 20 has achieved a desired, melted thickness. This can lead to inaccuracies in the thickness and overall configuration of the finished retainer R, as there is no standardization or regulation of the melting time or thickness for plate 20. Thus, a system for vacuum formation of a dental appliance solving the aforementioned problems is desired.

SUMMARY OF THE INVENTION

The system for vacuum formation of a dental appliance is a fully automated vacuum formation machine for dental appliances, such as retainers and the like. The system for vacuum formation of a dental appliance includes a base having a perforated top vacuum plate in communication with a vacuum source, as is conventionally known. The perforated top vacuum plate is adapted for receiving a dental impression cast.

A heating unit is positioned above the perforated top vacuum plate of the base, and a controller is in communication with the heating unit and the vacuum source for selective actuation thereof. The controller may be a computer, a programmable logic controller or the like. A holder is provided for releasably receiving a thermoplastic plate, and the holder is selectively positionable vertically over the perforated top vacuum plate and the dental impression cast. The holder may be positioned by a linear actuator, a motor or any other suitable drive system. The drive system is in communication with the controller.

In use, the dental impression cast is positioned on the perforated top vacuum plate and the controller actuates the heating unit to heat the thermoplastic plate, partially melting the plastic. The heated thermoplastic plate is then automatically lowered by the actuator in communication with the controller to cover the dental impression cast, and is molded therearound following actuation of the vacuum source (which is also controlled by the controller).

A sensor is positioned adjacent the perforated top vacuum plate for measuring the thickness of the thermoplastic plate as it is molded about the dental impression cast. The sensor may be any suitable type of optical sensor or any other suitable type of thickness measurement device. The sensor is in communication with the controller so that when the thermoplastic plate molded about the dental impression cast achieves a desired, pre-set thickness, the controller deactivates the heating unit, raises the holder and deactivates the vacuum source. Following cooling, the thermoplastic plate, now molded about the dental impression cast, may be removed from the cast and inserted into the mouth of a patient.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
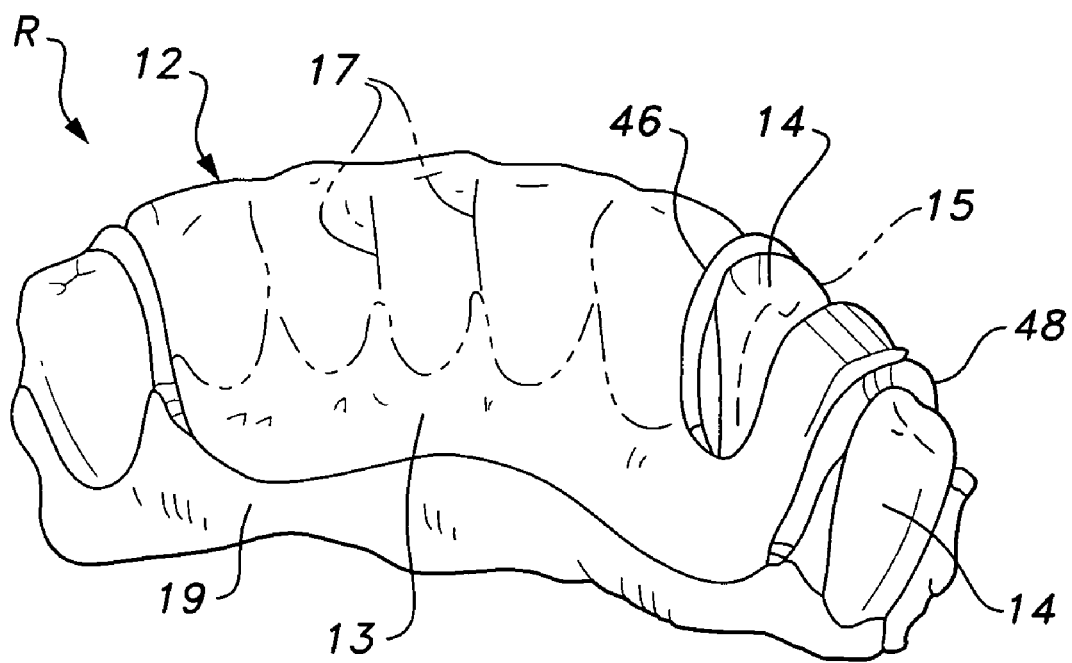
FIG. 1 is an environmental, perspective view of a typical dental appliance formed by the system for vacuum formation of a dental appliance according to the present invention.
Figure 2:
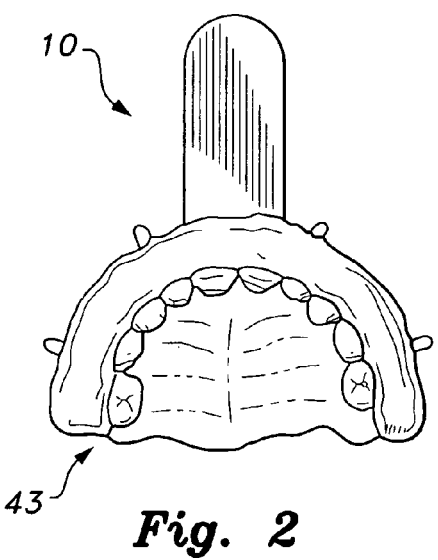
FIG. 2 is a top view of an exemplary dental impression.
Figure 3:
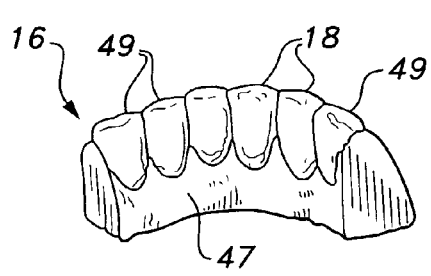
FIG. 3 is a perspective view of a dental impression cast formed from the dental impression of FIG. 2, taken from the lower anterior dentition of a patient.
Figure 5:
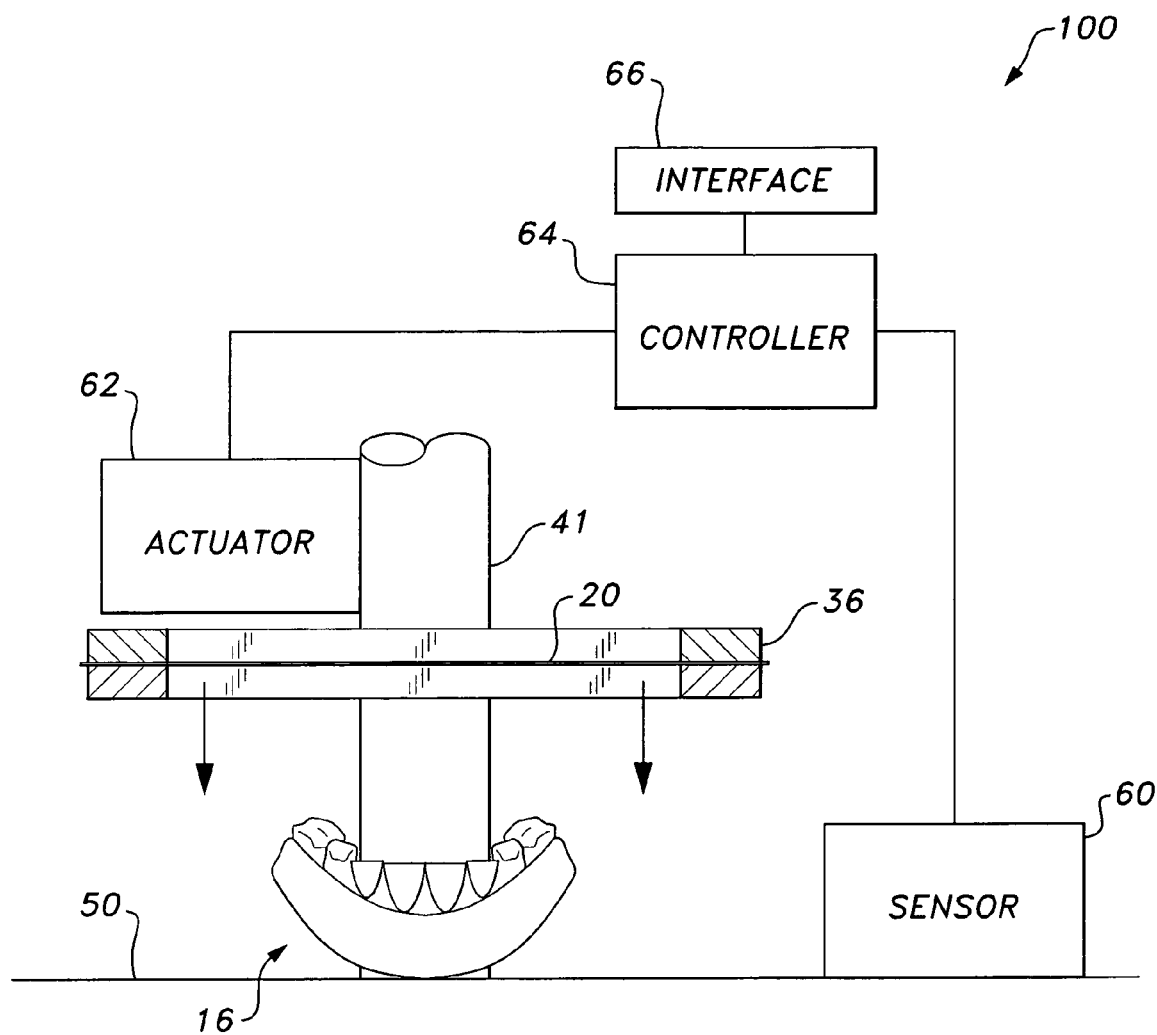
FIG. 5 is a diagrammatic view of the system for vacuum formation of a dental appliance.

FIG. 5 diagrammatically illustrates the system for vacuum formation of a dental appliance, the system being designated generally as 100. The system 100 is a fully automated vacuum formation machine for dental appliances, such as retainers and the like. It should be understood that retainer R, shown in FIG. 1, is shown for exemplary purposes only, and that system 100 may be used to form any desired type of dental appliance.

Figure 4:
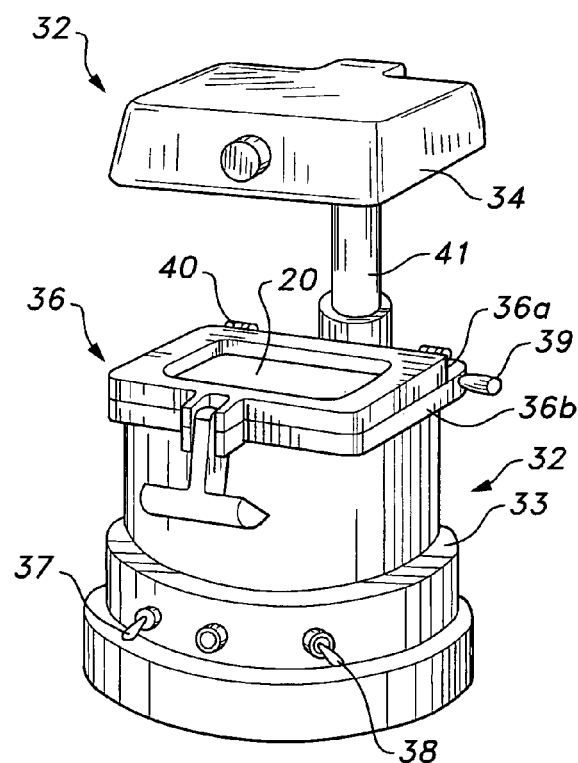
FIG. 4 is a perspective view of a prior art vacuum thermoforming machine used in forming a dental device.

The system 100 is similar to the vacuum formation machine 32 of FIG. 4, and includes a base, similar to base 33, having a perforated top vacuum plate 50 in communication with a vacuum source (not shown), as is conventionally known. As described above with reference to FIG. 4, the perforated top vacuum plate is adapted for receiving a dental impression cast, such as exemplary dental impression cast 16.

As with machine 32, a heating unit 34 is positioned above the perforated top vacuum plate 50 of the base 33 (mounted on frame post 41), and a controller 64 is in communication with the heating unit 34 and the vacuum source for selective actuation thereof. The controller 64 may be a computer, a programmable logic controller or the like. Preferably, an interface 66, which includes at least an input device, such as a keyboard or the like, and a display, is in communication with the controller 64, allowing the user to input a desired thickness for the dental appliance, and allowing the user to monitor and externally control the process, if necessary.

A holder, such as frame 36 of FIG. 4, is provided for releasably receiving a thermoplastic plate 20, and the holder 36 is selectively vertically positionable over the perforated top vacuum plate 50 and the dental impression cast 16. The holder 36 may be positioned by a linear actuator 62, a motor or any other suitable drive system. The drive system is in communication with the controller 64. In FIG. 5, system 10 is shown as having actuator 62 mounted on post 41 and being mechanically coupled to holder 36. It should be understood that holder 36 may be supported above vacuum plate 50 by any suitable type of support, and that the configuration of FIG. 4 (i.e., the post 41, extending between heating unit 34 and base 33) is used herein for exemplary purposes only. Further, holder 36 may be selectively lowered or raised with respect to vacuum plate 50 via any suitable mechanism, under the control of controller 64.

In use, the dental impression cast 16 is positioned on the perforated top vacuum plate 50 and the controller 64 actuates the heating unit 34 to heat the thermoplastic plate 20, partially melting the plastic. The heated thermoplastic plate 20 is then automatically lowered, via the actuator 62 in communication with the controller 64, so as to cover the dental impression cast 16 and be molded therearound following actuation of the vacuum source (which is also controlled by the controller 64).

A sensor 60 is positioned adjacent the perforated top vacuum plate 50 for measuring a thickness of the thermoplastic plate 20 as it is molded about the dental impression cast 16. The sensor 60 may be any suitable type of optical sensor or any other suitable type of thickness measurement device. The sensor 60 is in communication with the controller, such that when the thermoplastic plate 20 molded about the dental impression cast achieves a desired, pre-set thickness (input by the user via interface 66 and recorded in computer readable memory associated with controller 64), the controller 64 deactivates the heating unit 34, raises the holder 36 (with holder 36 having released the plastic plate 20, which is now molded about cast 16) and deactivates the vacuum source. Following cooling the thermoplastic plate 20 (which is now molded, forming retainer R or a similar dental appliance), the retainer R is removed from the cast 16 and inserted into the mouth of the patient.

Figure 6:
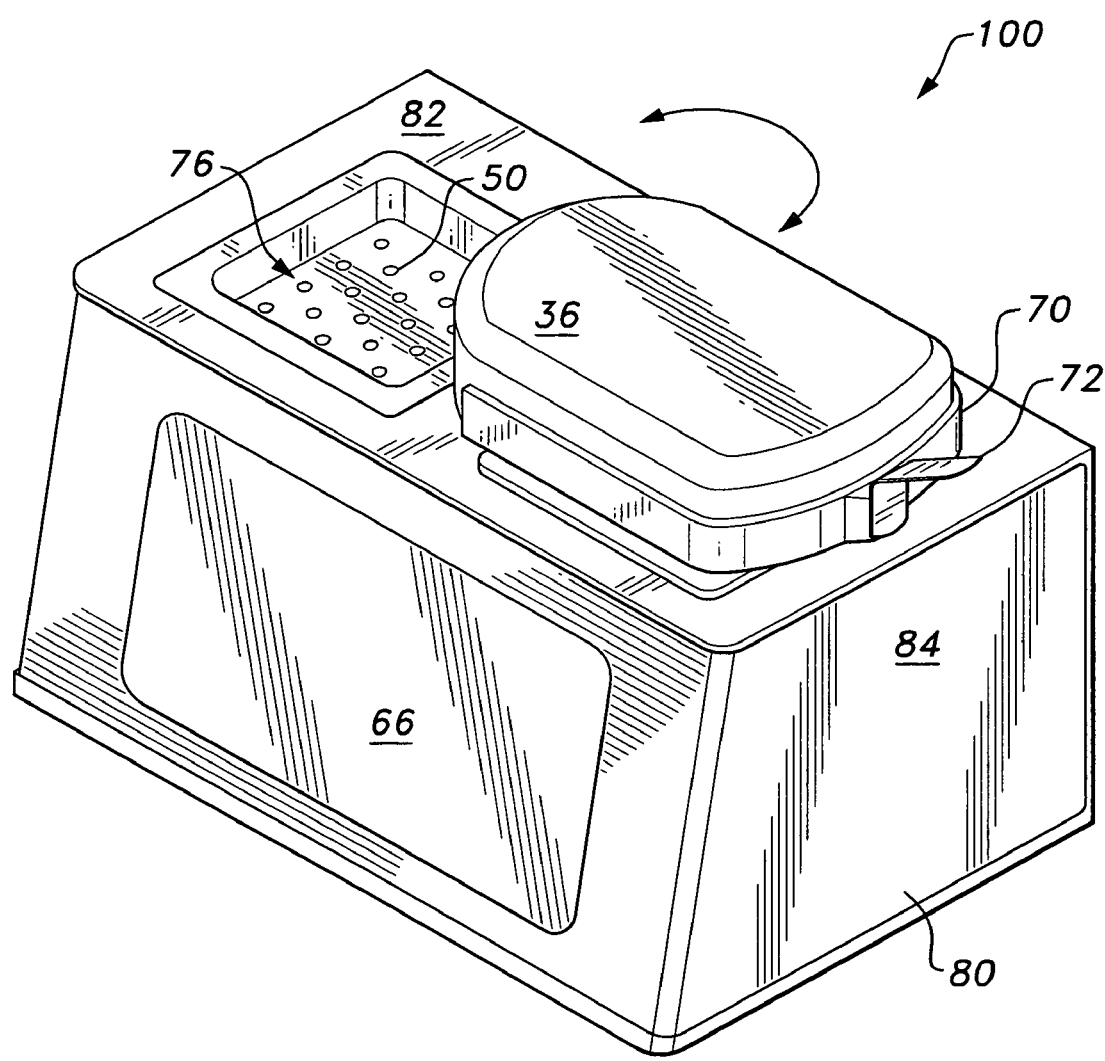
FIG. 6 is a perspective view of the system for vacuum formation of a dental appliance according to the present invention.
Figure 7:
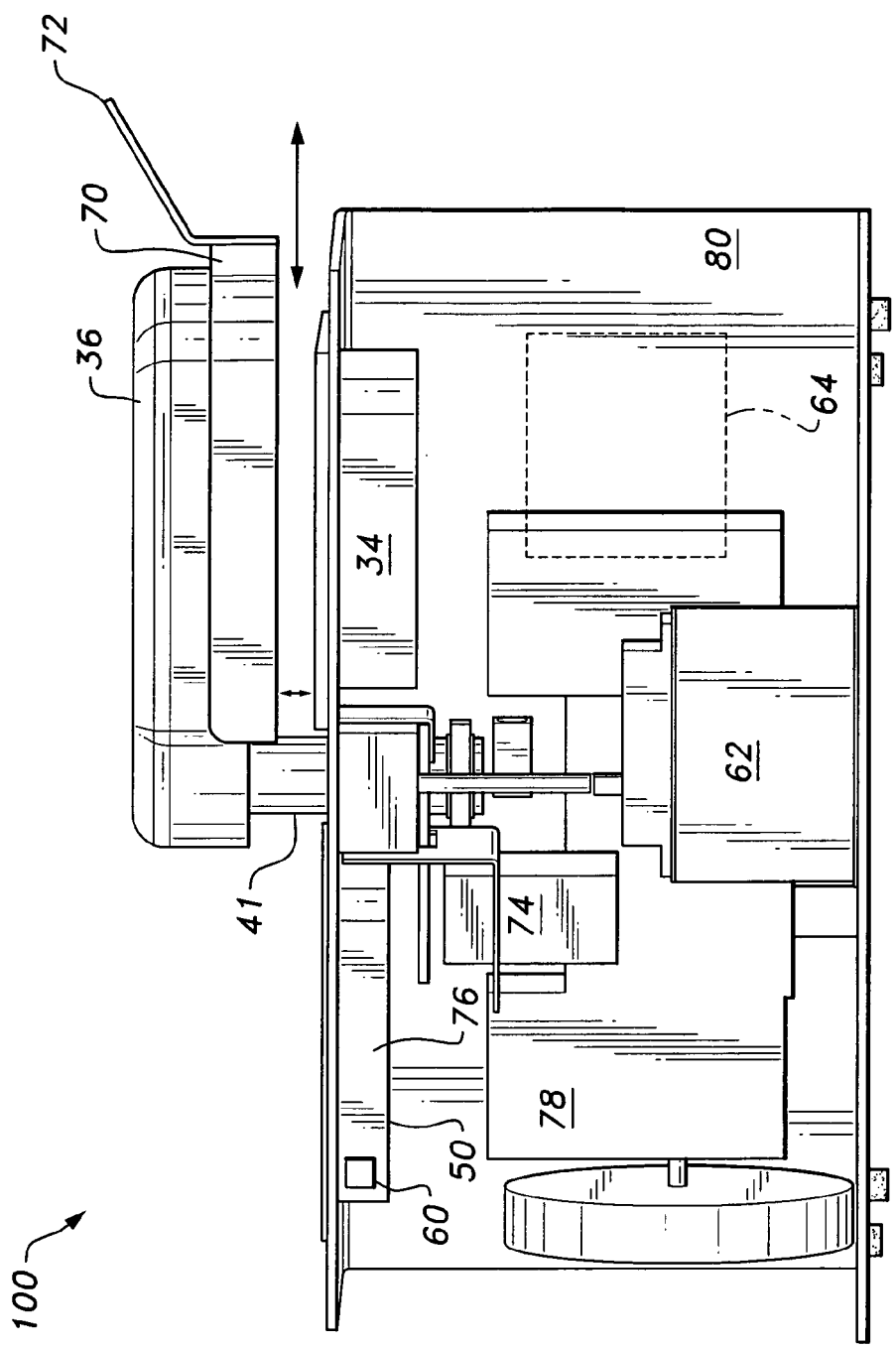
FIG. 7 is a front view of the system for vacuum formation of a dental appliance according to the present invention with portions of the housing omitted to show details thereof.

As shown in FIGS. 6 and 7, the controller 64, actuator 62, sensor 60 and interface 66 may be integrated into a housing 80 to form a single unit. Housing 80 includes at least one sidewall 84, an upper wall 82 and an opposed lower wall, as shown, adapted for support on a suitable support surface, such as a table or the like. As shown in FIG. 6, interface 66 is mounted to a front face of the at least one sidewall 84, and may include a keypad, a display, a touch screen or the like. It should be understood that any suitable type of interface, including data entry devices and, preferably, a display may be utilized. The interface 66 preferably includes a plurality of switches (between eight and ten, for example) or other suitable controls, allowing the user to manually control or program the thickness of the thermoplastic material, used in combination with sensor 60, which measures the thickness of the material. Preferably, this thickness is displayed to the user in real-time, using a display associated with interface 66.

In use, the dental impression cast 16 is positioned on the perforated top vacuum plate 50, which is preferably formed as a lower floor of a receptacle 76, mounted within the upper wall 82 of housing 80, as shown. As best shown in FIG. 7, holder 36 is mounted on the vertically adjustable post 41 and includes a sliding tray or drawer 70. The thermoplastic plate 20 is inserted within sliding tray 70 (which may include a handle 72 or the like) and then slid into the position shown in FIG. 7 to hold the thermoplastic plate 20 in place with respect to holder 36.

Following actuation input by the user (via interface 66), controller 64 actuates actuator 62, which may be a servomotor, a linear actuator or the like, to lower the post 41 and holder 36 such that thermoplastic plate 20 is positioned above, and adjacent to, the upper end of heater 34. The user may input data related to the particular type of thermoplastic plate 20 in order to set a particular heating time. Preferably, controller 64 includes a timer or timing circuit such that heater 34 is actuated for a pre-determined period of time to heat thermoplastic plate 20 to partially melt the plastic, after which the heater 34 is deactivated.

Following deactivation of the heater 34, the linear actuator 62 raises post 41 and holder 36 away from heater 34 and a rotational actuator 74, which may be a servo-motor or the like, causes post 41 and holder 36 to rotate approximately 180°, such that holder 36 is positioned above receptacle 76 and the dental impression cast 16 inserted therein. It should be understood that any suitable type of linear actuator 62 or the like may be utilized and, similarly, any suitable type of rotational actuator 74 may be utilized. Both linear actuator 62 and rotational actuator 74 are in communication with, and under the control of, controller 64, which may be any suitable type of processor, programmable logic controller, computer or the like.

The linear actuator 62 is then actuated to lower the heated thermoplastic plate 20 so as to cover the dental impression cast 16 and be molded therearound following actuation of the vacuum source 78, which may be any suitable type of vacuum pump or the like, and which is also controlled by the controller 64. Following molding, the holder 36 is raised and the molded appliance is removed therefrom.

As noted above, a sensor 60 is positioned adjacent the perforated top vacuum plate 50, within receptacle 76, for measuring the thickness of the thermoplastic plate 20 as it is molded about the dental impression cast 16. The sensor 60 may be any suitable type of optical sensor or any other suitable type of thickness measurement device. The sensor 60 is in communication with the controller 64, such that when the thermoplastic plate 20 molded about the dental impression cast 16 achieves a desired, pre-set thickness (input by the user via interface 66 and recorded in computer readable memory associated with controller 64), the controller 64 deactivates the vacuum pump 78 and raises the holder 36. Following cooling of the thermoplastic plate 20 (which is now molded, forming retainer R or a similar dental appliance), the retainer R is removed from the cast 16 and inserted into the mouth of the patient.

It is to be understood that the present invention is not limited to the embodiments described above, but encompasses any and all embodiments within the scope of the following claims.

I claim:

1. A system for vacuum formation of a dental appliance, comprising:
    a base having a perforated top vacuum plate in communication with a vacuum source, the perforated top vacuum plate being adapted for receiving a dental impression cast;
    a heating unit;
    a controller in communication with the heating unit and the vacuum source for selective actuation thereof;
    a holder for a thermoplastic plate;
    means for selectively positioning the holder for the thermoplastic plate adjacent the heating unit;
    means for selectively positioning the holder for the thermoplastic plate vertically over the dental impression cast, the means being in communication with the controller, wherein the controller selectively actuates the heating unit to heat the thermoplastic plate, the heated thermoplastic plate being lowered to cover the dental impression cast and be molded therearound following selective actuation of the vacuum source; and
    an optical sensor positioned adjacent the perforated top vacuum plate for directly measuring thickness of the thermoplastic plate, the sensor being in communication with the controller so that when the thermoplastic plate molded about the dental impression cast achieves a desired, pre-set thickness, the controller deactivates the vacuum source.

2. The system for vacuum formation of a dental appliance as recited in claim 1, further comprising a housing having opposed upper and lower walls and at least one sidewall.

3. The system for vacuum formation of dental appliance as recited in claim 2, further comprising a user interface in communication with said controller.

4. The system for vacuum formation of a dental appliance as recited in claim 3, further comprising a receptacle adapted for receiving the dental impression cast, the perforated top vacuum plate forming a floor of the receptacle, the receptacle being mounted on the upper wall of the housing.

5. The system for vacuum formation of a dental appliance as recited in claim 4, wherein said heating unit is mounted within said housing, said heating unit having an upper end positioned adjacent the upper wall of the housing.

6. The system for vacuum formation of a dental appliance as recited in claim 5, further comprising a post having an upper end and a lower portion, the holder for the thermoplastic plate being mounted on the upper end thereof external to said housing, the lower portion of the post being received within said housing.

7. The system for vacuum formation of a dental appliance as recited in claim 6, further comprising a linear actuator for selective vertical adjustment of the post and the holder for the thermoplastic plate.

8. The system for vacuum formation of a dental appliance as recited in claim 7, further comprising means for selectively rotating the post and the holder for the thermoplastic plate, so that the holder for the thermoplastic plate may be lowered adjacent the heating unit to heat the thermoplastic plate and then, following heating thereof, be raised and then selectively rotated above the dental impression cast mounted within the receptacle.

9. The system for vacuum formation of a dental appliance as recited in claim 8, wherein the holder for the thermoplastic plate includes a sliding tray for receiving the thermoplastic plate.

10. A system for vacuum formation of a dental appliance, comprising:
   a housing having opposed upper and lower walls and at least one sidewall;
   a perforated top vacuum plate mounted on the upper wall of the housing;
   a vacuum source disposed within the housing, the perforated top vacuum plate being in communication with the vacuum source, the perforated top vacuum plate being adapted for receiving a dental impression cast;
   a heating unit;
   a controller in communication with the heating unit and the vacuum source for selective actuation thereof;
   a holder for a thermoplastic plate;
   means for selectively positioning the holder for the thermoplastic plate adjacent the heating unit;
   means for selectively positioning the holder for the thermoplastic plate vertically over the dental impression cast, the means being in communication with the controller, the controller selectively actuating the heating unit to heat the thermoplastic plate, the heated thermoplastic plate being lowered to cover the dental impression cast and be molded therearound following selective actuation of the vacuum source; and
   an optical sensor positioned adjacent the perforated top vacuum plate for directly measuring thickness of the thermoplastic plate, the sensor being in communication with the controller so that when the thermoplastic plate molded about the dental impression cast achieves a desired, pre-set thickness, the controller deactivates the vacuum source.

11. The system for vacuum formation of a dental appliance as recited in claim 10, further comprising a receptacle adapted for receiving the dental impression cast, the perforated top vacuum plate forming a floor of the receptacle, the receptacle being mounted on the upper wall of the housing.

12. The system for vacuum formation of dental appliance as recited in claim 11, further comprising a user interface in communication with said controller.

13. The system for vacuum formation of a dental appliance as recited in claim 12, wherein said heating unit is mounted within said housing, an upper end of said heating unit being positioned adjacent the upper wall of the housing.

14. The system for vacuum formation of a dental appliance as recited in claim 13, further comprising a post having an upper end and a lower portion, the holder for the thermoplastic plate being mounted on the upper end thereof external to said housing, the lower portion of the post being received within said housing.

15. The system for vacuum formation of a dental appliance as recited in claim 14, further comprising a linear actuator for selective vertical adjustment of the post and the holder for the thermoplastic plate.

16. The system for vacuum formation of a dental appliance as recited in claim 15, further comprising means for selectively rotating the post and the holder for the thermoplastic plate, so that the holder for the thermoplastic plate may be lowered adjacent the heating unit to heat the thermoplastic plate and then, following heating thereof, be raised and then selectively rotated above the dental impression cast mounted within the receptacle.

17. The system for vacuum formation of a dental appliance as recited in claim 16, wherein the holder for the thermoplastic plate includes a sliding tray for receiving the thermoplastic plate.

18. The system for vacuum forming of a dental appliance as recited in claim 17, further comprising a handle mounted on the sliding tray.

* * * * *